United States Patent [19]

Steinberger et al.

[11] 4,380,019

[45] Apr. 12, 1983

[54] DEVICE FOR MONITORING THE SUPPLY OF PRINTING FLUID IN INK PRINTING DEVICES

[75] Inventors: Wolfgang Steinberger, Greilsberg; Gerhard Stempfl, Toeging, both of Fed. Rep. of Germany

[73] Assignee: Siemens Aktiengesellschaft, Berlin & Munich, Fed. Rep. of Germany

[21] Appl. No.: 297,368

[22] Filed: Aug. 28, 1981

[30] Foreign Application Priority Data

Sep. 10, 1980 [DE] Fed. Rep. of Germany ....... 3034067

[51] Int. Cl.³ ............................................. G01D 15/16

[52] U.S. Cl. ................................................ 346/140 R

[58] Field of Search .................................. 346/140, 75

[56] References Cited

U.S. PATENT DOCUMENTS 2,484,298 10/1949 Krahulec ........................ 346/140 A 3,771,165 11/1973 Kurimoto et al. .............. 346/140 R

FOREIGN PATENT DOCUMENTS 1554481 10/1979 United Kingdom .

1574527 9/1980 United Kingdom .

*Primary Examiner*—Donald A. Griffin

*Attorney, Agent, or Firm*—Hill, Van Santen, Steadman, Chiara & Simpson

[57] ABSTRACT

A mechanical device for monitoring the supply of ink in an ink storage reservoir carried by the printing carriage of an ink printing device is situated at one end of the path of movement for the printing carriage. The ink reservoir is mounted on the printing carriage and contains a freely reciprocable tappet member having an upstanding stem extending through the housing cover of the ink reservoir which is freely movable up and down in accordance with the level of remaining ink supply. The mechanical monitoring device is operated dependent upon the vertical position of the tappet stem each time a printing operation is begun by virtue of movement of the printing carriage toward the monitoring device so that the relative position of the tappet member may be sensed by the device. The mechanical monitoring device comprises a pivotable lever arm disposed perpendicular with respect to the movement path of the ink reservoir and printing carriage to be laterally engaged by the tappet in the event that the ink supply is sufficient and the tappet is upraised. When the lever arm is engaged, its lateral movement triggers an electrical switch which operates an electrical circuit to indicate to the operator that the ink supply is adequate. When the ink supply is too low, the tappet is lowered such that the tappet passes beneath the lever arm without engaging and the switch is not triggered, causing an alarm signal to be actuated on the ink printing device informing the operator to replenish the ink supply.

5 Claims, 3 Drawing Figures

DEVICE FOR MONITORING THE SUPPLY OF PRINTING FLUID IN INK PRINTING DEVICES

BACKGROUND OF THE INVENTION

The invention relates to a device for monitoring the supply of printing fluid in a reservoir for an ink printing device which changes its supply volume in accordance with consumption of the printing fluid.

In typical ink printing devices, a printing head is moved by a drive means along a recording medium and is supplied with printing ink by a supply system from a storage reservoir. The printing head may be a mosaic printing head having several piezoelectrically operated nozzles. Because of the contraction processes which take place in these nozzles during the printing operation, a printing head of this type is supplied automatically with printing fluid. If the ink reservoir is made an integral part of the printer head, as has been proposed, then simple visual monitoring of the ink supply in a reservoir is not readily possible. However, continuous monitoring of the ink supply is essential when printers of this kind are used in teleprinter and dataprinter applications.

One device for determining the ink level in a printer head ink reservoir is disclosed in the British Specification No. 1574527. There, two electrodes are disposed in the base of the ink reservoir for wetting by printing fluid when present in the reservoir. An electrical circuit is connected to the electrodes and arranged to detect the electrical resistance therebetween and to provide a signal at a predetermined value of the resistance. A display device responsive to the signal provides a warning indication when the ink reservoir is essentially empty of printing fluid. If an ink reservoir is to be manufactured economically as a simple throwaway product, then the manufacture of ink reservoirs with electrodes integrated into their bases substantially raises the product costs. In addition, this type of ink monitoring arrangement requires additional electrical connections which must be arranged on the printing carriage.

British Specification No. 1554481 discloses an ink storage container which is economical and readily replaceable in the ink printing device. The storage container utilizes a weighted cover component disposed over the ink supply for producing a temporary increased pressure in the container. The brief increases in ink pressure are necessary for ink printing devices utilizing piezoelectrically driven printing nozzles in order to eliminate air trapped in the supply system, which may be caused when the ink printing device is placed in operation or when the ink reservoir container is interchanged.

The present invention provides for a simple and economical device for monitoring fluid supply in an ink reservoir container for use with an ink printing device having an interchangeable ink reservoir container integrated into a printing head having piezoelectrically operated nozzles.

SUMMARY OF THE INVENTION

A printing carriage for an ink printing device is formed with an ink printing head at one end for passing along a recording medium and an ink storage reservoir carried at its other end. The reservoir assembly includes a freely reciprocable tappet member which projects from the container housing cover and is displaced up and down depending upon the changes in level of the ink supply volume in the reservoir. A stationary sensing means for monitoring the available supply of ink in the reservoir is positioned at one end of a guide bar arrangement which supports the printing carriage for back and forth movement in the printing device. The sensing means comprises a pivotable bracket member which is formed with a slide opening along one side surface and a leading edge bevelled surface acts as a cam follower when engaged by the housing cover of the ink reservoir. A transversely directed sensing lever is positioned in the bracket member disposed perpendicular to the lateral path movement of the ink reservoir on the printing carriage. A lead end of the lever fits into the bracket slide opening and is spring biased laterally in the direction of the oncoming ink reservoir. When the housing cover of the ink reservoir engages against the bracket, the bevel edge surface causes the bracket to ride upward and onto the housing cover, such that the tappet is passed toward the transversely directed lever arm. When the ink supply is sufficient in the reservoir container, the tappet is disposed upwardly and engages against the lever arm forcing the lever arm backward against the bias of its spring. The pivot point end of the lever arm is disposed adjacent an electric switch which is triggered by backward movement of the lever arm to operate an electric circuit which indicates a sufficient ink supply remains in the reservior. When the ink supply is too low, the tappet member is disposed downward and passes under the sensing lever arm, such that the lever arm is not moved backward and the electric switch is not triggered. In this case, the electric circuit is not actuated and an alarm device signals the operator that the ink reservoir needs to be filled.

The tappet member is also utilized to produce a temporary increased pressure on the ink supply in the container. In addition, the tappet member may be provided with markings indicating the ink level in the reservior, such that the relative changes in the level of ink supply can be readily observed.

Thus, the inventive device provides for an extremely economical and reliable ink monitoring arrangement. The inventive device is significantly advantageous in that no additional electrical connections need be conducted to the printing carriage and it is no longer necessary to arrange electrode contacts inside the ink reservoir container.

DESCRIPTION OF THE PREFERRED EMBODIMENT

Figure 1:
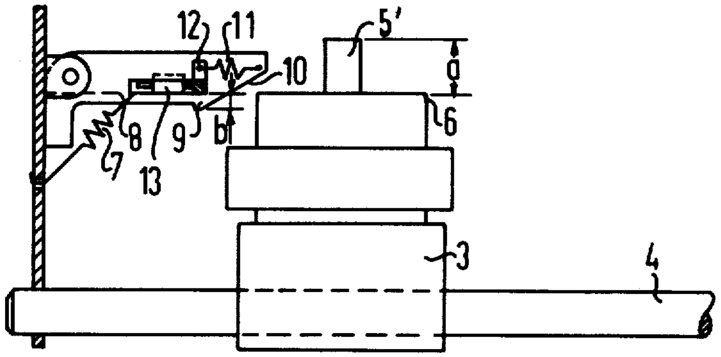
FIG. 1 is a schematic side elevational view of an ink monitoring device arrangement in accordance with the present invention.
Figure 2:
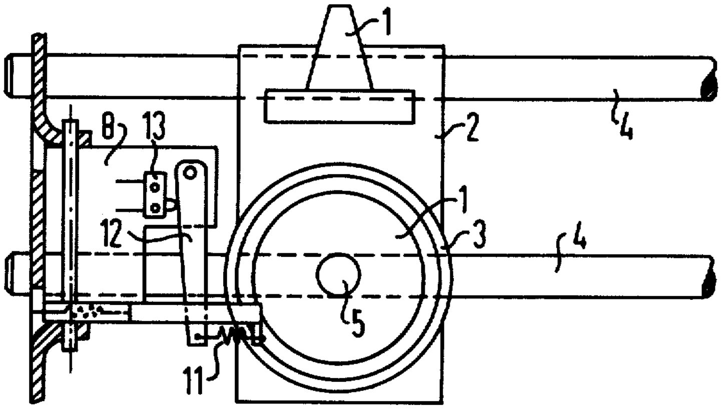
FIG. 2 is a schematic plan view of a printing carriage and the ink monitoring device of FIG. 1.
Figure 3:
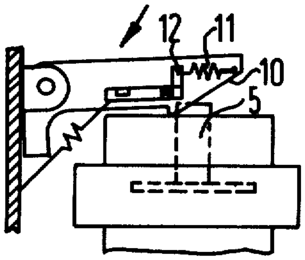
FIG. 3 is a fragmentary, schematic side elevational view showing the sensing position of the ink monitoring device of FIG. 1 in an instance when the ink reservoir requires re-filling.

With reference to FIGS. 1–3, there is illustrated a portion of an ink printing device in which a printing carriage 2 is supported for back and forth movement along a lateral guide bar arrangement 4 by means of a conventional electrical motor drive (not shown). Disposed at one end of the printing carriage is a printing head 1 having known piezoelectrically driven printing nozzles which serve to print in line-by-line fashion along a recording medium. An ink storage reservoir 3 is carried on the other end of the printing carriage 2 for lateral movement with the carriage.

The ink reservoir 3 comprises a cylindrical container housing, preferably made of plastic material, for holding an inserted plastic bag containing ink. A cover member 6 fits onto the cylindrical housing 3 for supporting a freely reciprocable tappet member 5 extending through the housing cover. The tappet member 5 has a cylindrical stem portion extending upward through the cover and a lower end plate portion which is located interior of the reservoir housing and acts as a pressure force resting against the ink bag. The pressure force exerted by the tappet member 5 serves to increase the pressure in an ink supply system (not shown) running between the ink bag contained in the reservoir housing and the printing nozzles of the printer head 1. This pressure force acts to eliminate any air which may have penetrated into the ink supply system during replacement of ink bags. The upstanding stem portion of the tappet member 5 serves as a display means indicating the level of ink supply in the ink reservoir 3. As printing fluid in the ink reservoir 3 is consumed during printing operations, the tappet member is lowered relative to the reservoir housing cover from an initial raised height, shown in FIG. 1, indicating a full supply of ink in the reservoir along the path a to a lowered height level, shown in FIG. 3, indicating the supply volume of the ink reservoir 3 has been reduced to a minimum and requires replenishment with a new ink bag.

It is necessary to monitor the ink supply in an ink printing device, especially when used in teleprinter and dataprinter applications, for two purposes, i.e., as to whether or not any ink at all remains in the ink reservoir and as to whether or not a certain minimum supply volume of ink remains in the ink reservoir for a given printing operation. An ink monitoring assembly constructed in accordance with the present invention is disposed at one lateral end of the guide bar arrangement for the printing carriage 2. The monitoring assembly comprises a pivotally mounted, fork-shaped bracket member 8 which is spring biased downward by means of a spring member 7. A relatively elongated side surface of the bracket 8 is formed with a lateral slide opening 9 and has a leading bevelled edge surface 10 facing laterally outward toward the oncoming cover portion 6 of the ink reservoir 3. A sensing lever arm 12 is mounted for pivotable lateral movement in the bracket 8, having a free end extending through the slide opening 9. The lever arm 12 is disposed transversely of the lateral movement path of the ink reservoir 3 and has a spring member 11 connected to the free end of the lever arm for biasing the lever arm laterally in the direction of the oncoming ink reservoir 3. Disposed adjacent the pivotable end of the lever arm 12 is an electrical switch means 13 having a trigger abutment facing an adjacent edge surface of the lever arm, such that laterally outward movement of the lever arm 12 causes triggering of the switch 13 and, thus, actuation of an electrical circuit. The fork shape of the bracket provides for a transverse opening across which the lever arm extends and which is in line with the lateral travel path of the tappet member 5.

The ink monitoring assembly operates in the following manner. Upon undertaking a new printing operation, such as when a fresh page of recording medium is inserted via a conventional automatic paper supply device (not shown) into the printing device, the electrical drive for the printing carriage 2 passes the printing carriage to the left end, as shown in FIGS. 1-3, of the guide bar arrangement 4 to execute a check of the ink reservoir supply. To this end, the cover 6 of the ink reservoir 3 engages against the leading bevelled surface 10 of the bracket 8 such that a camming action ensues riding the bracket upward and over along the housing cover until the slide opening 9 is disposed substantially parallel over the flat top surface of the cover. The printing carriage 2 continues its leftward lateral movement, bringing the upstanding stem portion of the tappet member 5 into the open region of the bracket across which the lever arm 12 is disposed. If the ink supply in the ink reservoir 3 is still sufficient, the tappet stem is raised and engages against the lever arm 12, pushing it laterally outward against the bias of the spring 11. Thus, the switch 13 is triggered and the electrical circuit connected to the switch is actuated sending a signal to a suitable control device, so that no warning or indication of inadequate ink supply is given to the operator. In this manner, a state of "sufficient ink supply" is assigned to actuation of the switch 13.

If the ink supply in the reservoir 3 is depleted or the level of ink in the reservoir 3 dips below a predetermined threshold level, the stem of the tappet member 5 is sufficiently lowered relative to the upper surface of the cover 6 so that the tappet 5 passes under the lever arm 12 without engagement. Accordingly, the electric switch 13 is not triggered and, in this case, no "sufficient ink supply" signal is sent to the control device. The control device is suitably arranged so that, if no signal is sent by the switch 13, an alarm signal occurs, which can be, for example, the illumination of an alarm light at the keyboard of the ink printing device. This alarm signal notifies the operator to replace the ink bag and replenish the ink supply in the ink reservoir 3. The predetermined threshold value for the ink supply may be set as desired, so that, for example, there would still be ink in the ink reservoir sufficient to permit the printing device to print at least one further printed page of recording medium.

It is further within the contemplation of the present invention to provide the stem of the tappet member 5 with colored markings in order to permit an operator to determine optically the amount of remaining ink supply at any given moment. The colored markings could be set in registration with the reservoir cover 6 such that a general supply state of the ink reservoir 3 could be immediately identified.

It is also within the contemplation of the present invention that ink monitoring mechanisms other than the mechanical arrangement described above could be used in conjunction with a tappet member to indicate whether or not the ink reservoir needed to be re-filled. For example, sensing of the tappet member could be carried out by means of an infrared light barrier detection means or the like.

Although various minor modifications may be suggested by those versed in the art, it should be understood that we wish to embody within the scope of the patent warranted hereon all such modifications as reasonably and properly come within the scope of our contribution to the art.

We claim as our invention:

1. Apparatus for monitoring ink supply for an ink printing device comprising a printing carriage means disposed for back and forth movement on a lateral path along a guidance structure, a printer head means mounted on said printing carriage means, an ink reservoir housing for containing an ink supply mounted on said printing carriage means cooperatively connected to said printer head means via a supply means, said reservoir housing having a cover portion and a tappet member, said tappet member having a base portion for resting on the upper level of the ink supply and an upstanding stem portion freely projecting through said cover portion for reciprocable movement in accordance with the changing level of the ink supply, and a monitoring means stationarily mounted at one lateral end of said guidance structure disposed in the movement path of said reservoir housing for sensing the degree of projection of said stem portion over said cover portion to detect the level of ink supply in said reservoir housing.

2. The apparatus of claim 1, wherein said monitoring means comprises a fork-shaped bracket member defining a transverse intermediate opening for receiving lateral movement of said tappet member, a pivotable lever arm positioned across said opening directed transversely of the movement path of said reservoir housing, a spring means biasing a free end of said lever arm laterally toward said reservoir housing, and a signal switch means disposed on the other side of said lever arm from said reservoir housing for being triggered when said stem portion engages said lever arm to indicate sufficient ink supply.

3. The apparatus of claim 2, wherein said bracket member is pivotable about a transverse axis and is formed with a wall portion having a lateral slide opening for receiving therethrough said lever arm free end and a bevelled leading edge for riding said bracket member up and over said cover portion to position said lever arm in the movement path of said tappet member stem portion.

4. The apparatus of claim 2, wherein said bracket member receives said stem portion in said intermediate opening only during the end portion of a lateral stroke of said printing carriage means.

5. The apparatus of claim 1, wherein said stem portion is formed with markings for generally optically indicating the level of ink supply in said reservoir housing.

* * * * *